Dec. 1, 1931.   T. H. DEBNAM ET AL   1,833,989
AGRICULTURAL IMPLEMENT
Filed Dec. 17, 1929   2 Sheets-Sheet 1

Inventor
T. H. DEBNAM
E. C. FERGUSON

By C. L. Parker Jr.
Attorney

Dec. 1, 1931.  T. H. DEBNAM ET AL  1,833,989
AGRICULTURAL IMPLEMENT
Filed Dec. 17, 1929    2 Sheets-Sheet 2
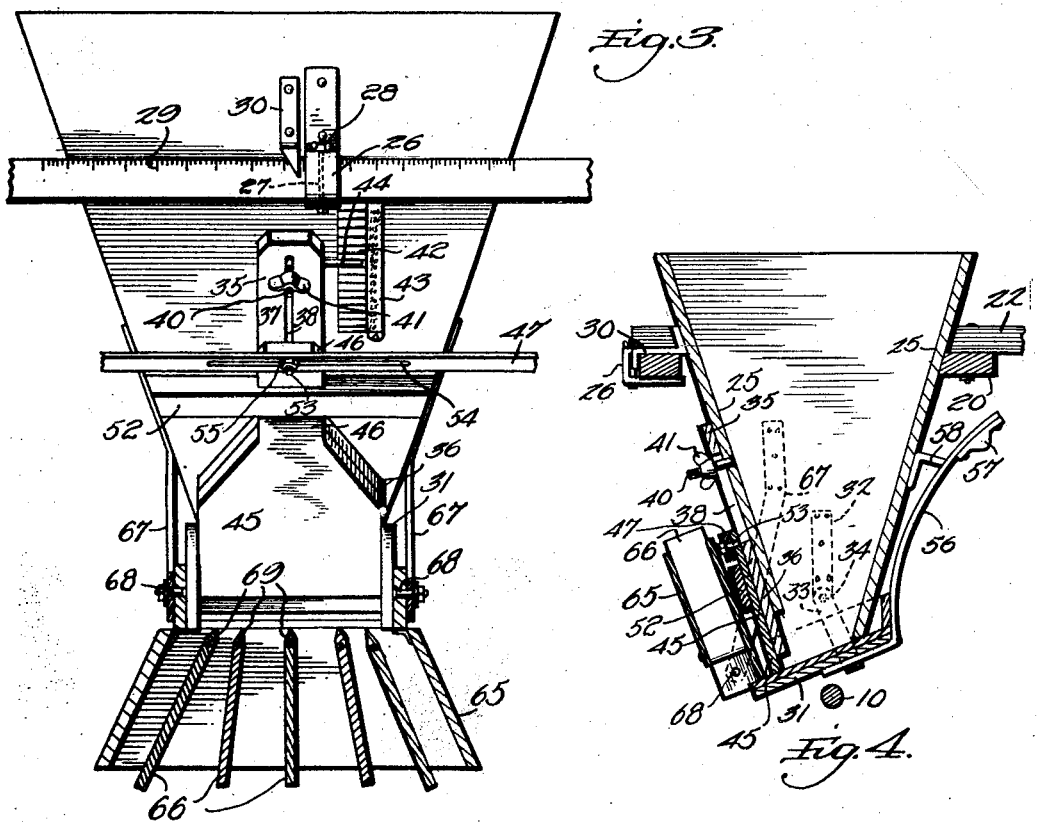
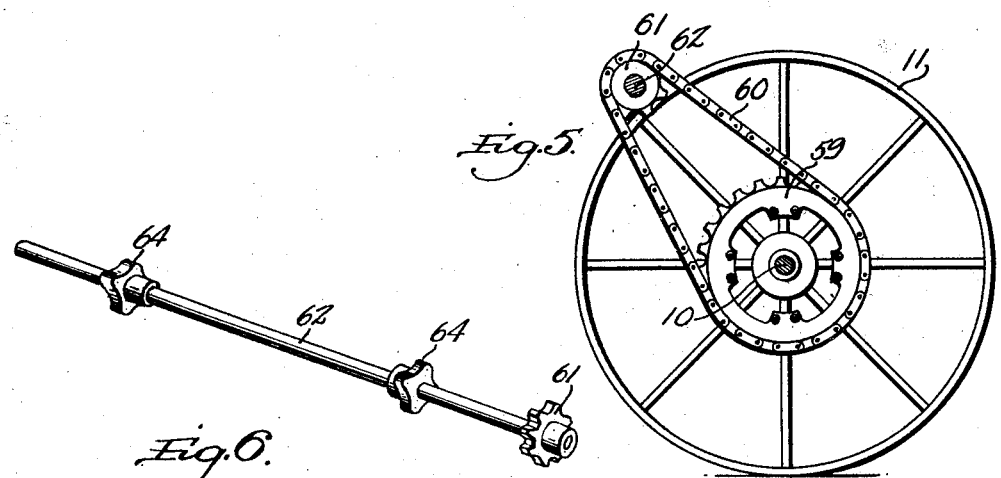
Inventor
T. H. DEBNAM
E. C. FERGUSON
By C. L. Parker, Jr.
Attorney Patented Dec. 1, 1931

1,833,989

UNITED STATES PATENT OFFICE

THOMAS HALL DEBNAM AND EDWIN CARL FERGUSON, OF SUFFOLK, VIRGINIA

AGRICULTURAL IMPLEMENT

Application filed December 17, 1929. Serial No. 414,770.

This invention relates to an agricultural implement and particularly to a machine for distributing lime, guano, and the like.

An object of the invention is to provide a machine of the character referred to having a frame carried upon traction wheels, the frame being arranged to adjustably support a plurality of spaced hoppers whereby a plurality of rows of earth may be simultaneously fed with material from the hoppers, and whereby adjustment of the hoppers is permitted to predetermine the distance between each hopper.

Another object is to provide a pivoted shoe or chute adjacent the bottom of each hopper to receive material therefrom, means being provided to gauge the amount of material permitted to flow from the shoe.

A further object is to provide means for vibrating the shoe while the material is flowing therethrough and to utilize a portion of the vibrating means to resiliently oppose pivotal movement of the shoe when the flow of material from the latter is prevented by the gauging means whereby the shoe will be free to quickly return to a position in which it may be vibrated when the gauging means are opened to permit the flow of material through the shoe.

A further object is to arrange the shoe whereby it is slightly inclined in its operative position to permit the flow of material through the shoe and to utilize a portion of the vibrating means as a weight whereby the shoe has a normal bias to its operative position.

A further object is to provide a pivoted distributor adjacent the outlet end of the shoe, the distributor being provided with a plurality of passageways which may be varied both as to size and direction.

Other objects and advantages of the invention will become apparent during the course of the following description.

Figure 1:
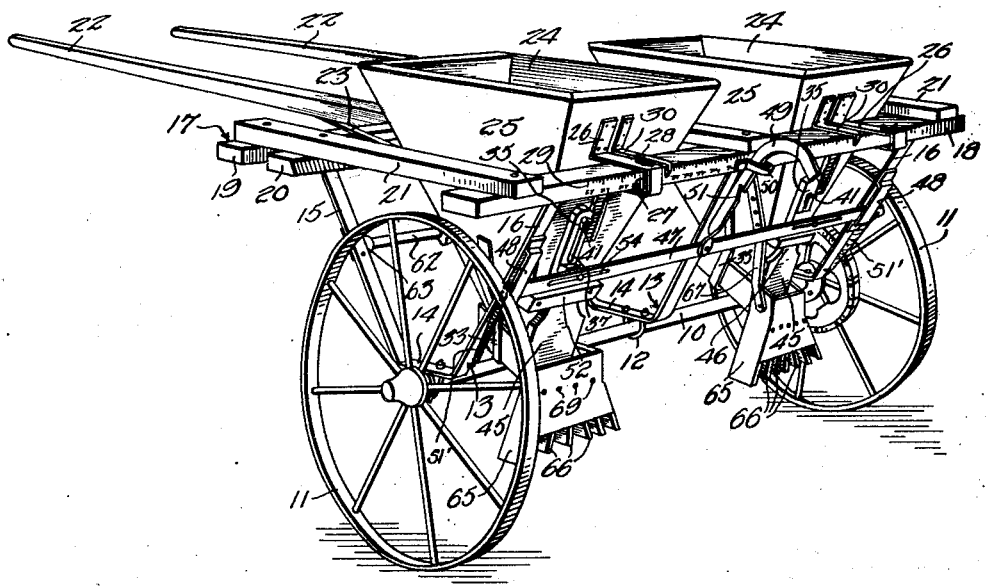

In the drawings we have shown a preferred embodiment of the invention. In this showing, Figure 1 is a perspective view of the machine as a whole, Figure 2 is a central vertical sectional view through one hopper showing the shoe in open position, Figure 3 is a rear elevation of one hopper with the distributor shown in section, Figure 4 is a view similar to Figure 2 except that the shoe is shown in closed position, Figure 5 is a side elevation of the drive means for the shaft which operates the vibrator, and, Figure 6 is a perspective view of the shaft which operates the vibrator.

Referring to the drawings the numeral 10 indicates a shaft having traction wheels 11 rotatably mounted on each end thereof. At spaced points on the shaft 10 a plurality of brackets 12 are secured thereto and each bracket serves to secure a frame support indicated as a whole by the numeral 13 to the shaft 10. Each frame support comprises a horizontal portion 14 to which the brackets 12 are secured, a forward upwardly inclined arm 15 and a rear upwardly inclined arm 16. A frame indicated as a whole by the numeral 17 is suitably secured to the upper extremities of the arms 15 and 16 and this frame comprises a rear horizontal beam 18, a pair of forward horizontal beams 19 and 20 respectively, and horizontal cross beams 21 suitably secured thereto. If desired a pair of tongues or the like 22 may be secured to the forward side of the frame and angular braces 23 may be arranged between each tongue 22 and the adjacent outer cross bar 21, as shown in Figure 1.

A plurality of hoppers 24 are mounted between the horizontal beams 18 and 20. These hoppers are provided with downwardly tapering walls 25 and the inner face of the beam 20 is tapered to snugly engage the forward side of the hopper at a point spaced below the top of the latter. The rear wall of each hopper has a resilient clip 26 secured thereto and this clip is substantially U-shaped whereby it will substantially surround and be slidable on the beam 18. Adjacent the outer extremity of the clip a bolt 27 provided with a wing nut 28 is arranged to tighten the clip to the bar 18 and thus prevent horizontal movement of the hopper along the bar. The outer face of the beam 18 may be calibrated as at 29 to indicate the distance between adjacent hoppers and each hopper is provided with a pointer or the like 30 whereby the distance between adjacent hoppers may be quickly ascertained. While the present machine is illustrated as having two hoppers, it will be apparent that any number of hoppers may be used as may be desired.

Figure 2:
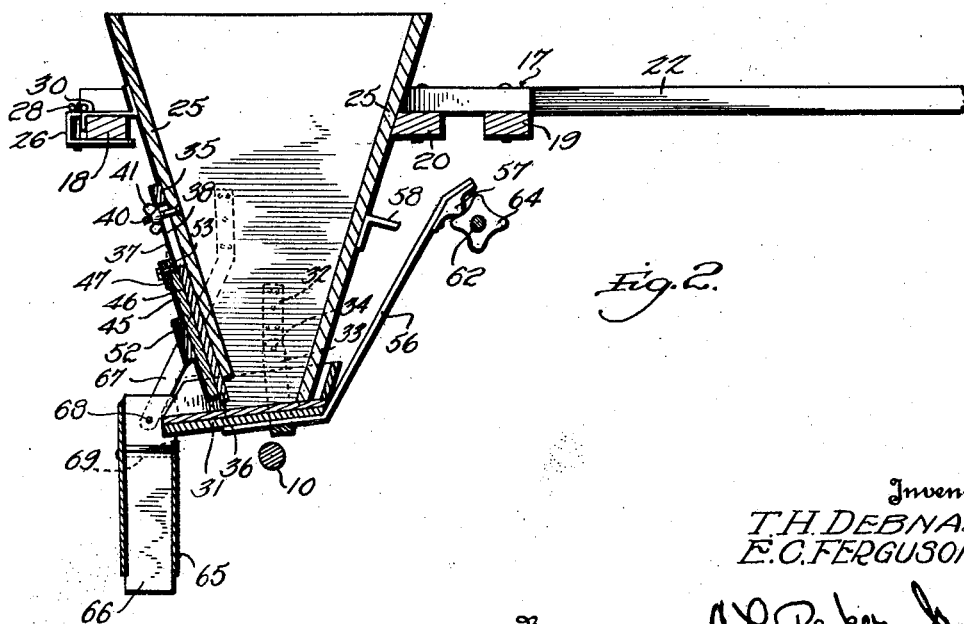

Referring to Figures 2 and 4, the rear wall 25 of each hopper terminates a slight distance above the lower end of the forward walls and a shoe 31 or the like is pivotally secured to each hopper adjacent the bottom thereof. Each shoe is in the shape of a trough provided with side and front walls, the rear of the trough being open whereby communication between the interior of the hoppers is established through the shoes. The outer faces of each side wall of the hoppers are provided with a strip 32 to which a strap 33 is pivotally connected as at 34, the straps being formed integral with, or being suitably connected to the shoes whereby the latter will pivot at the point 34. It will be apparent that material which is fed into the hoppers is adapted to pass out through the shoes.

Means are provided for gauging the amount of material permitted to pass out of each hopper. Each rear wall 25 is equipped with a gate 35 movable longitudinally thereof and the lower portion 36 of each gate is of a width sufficient to snugly fit between the side walls of the shoe. Each gate is provided with a shank portion 37 in which a longitudinal slot 38 is arranged. Threaded bolts 40 or the like have one end secured in the rear walls 25 and extend through the slots 38. A wing nut 41 is adapted to be threaded on each bolt 40 to assist in maintaining the gates at desired heights, as will be understood. Adjacent each shank portion 37 the rear walls 25 are provided with a rack 42 having indicia 43 arranged on one side thereof. The teeth of the racks 42 are of a very slight pitch and pins 44 carried by the shanks 37 are adapted to be secured in selected positions in the racks. It will be apparent that with the indicia arranged adjacent each groove in the racks amounts of material passing beneath the doors 35, or the distance between the bottom of the shoes and the doors may be indicated, or any suitable indicia may be placed thereon. The primary object of the gates 35 is to extend into the shoes a sufficient distance to regulate or gauge the amount of material passing through the shoes as will be understood.

A second gate 45 is arranged outwardly of each gate 35 and the shanks 46 thereof are considerably shorter in length than the shanks 37. The upper end of each shank 46 is secured to a movable bar 47 whereby movement of the latter is adapted to raise and lower the gate 45. As shown in Figure 1 the bar 47 has its ends slidably mounted in brackets 48 carried by the outer arms 16 and centrally of the bar an operating handle 49 is provided. The handle 49 extends upwardly through a bracket 50 and is provided with a notch 51 adapted to engage one side of the bracket 50 when the handle is in its upward position. The ends of the bar 47 extend slightly beyond the bracket 48 and a coil spring 51' is arranged adjacent each end of the bar. As shown, the upper end of each spring is secured respectively to the ends of the bar and the lower end of each spring is secured to the outer arms 16 adjacent the bottom of the latter. The purpose of the springs 51 is to automatically close the doors 45 when the handle 49 is released from engagement with the bracket 50. The lower portion of the doors 45 are also of a width sufficient to snugly fit between the side walls of the shoes and the primary object of these doors is to entirely close the troughs of the shoes and prevent the flow of material therefrom. A guide bar 52 is arranged outwardly of each door 45 to prevent accidental displacement of the latter and to guide the doors during their longitudinal movement. It will be apparent that the doors 45 may be closed or opened without effecting the position of the doors 35. The upper extremity of each shank 46 has a bolt 53 secured therein and the outer end of each bolt extends through relatively long longitudinal slots 54 arranged in the bar 47. A nut 55 is adapted to be threaded on the outer extremity of the bolts 53 to secure the doors 45 to the rod 47. The purpose of the longitudinal slots 54 is to permit movement of the doors laterally when the hoppers are horizontally adjusted.

Resilient members 56 preferably in the form of flat bent springs have one end of each suitably secured to the bottom of each shoe 31 and their opposite ends are substantially free and are provided with cam surfaces 57. Adjacent the cam surfaces the front wall of each hopper is provided with a projection 58 for a purpose to be described.

One of the traction wheels 11 is provided with a large sprocket 59 suitably secured thereto to rotate therewith. A chain 60 connects this sprocket with a small sprocket 61 rigidly secured to a shaft 62 arranged transversely of the machine and journaled in suitable brackets 63 carried by the arms 15. At spaced intervals on the shaft 62 cam gears 64 are suitably secured thereto and each cam gear is adapted to be arranged in proximity to a cam surface 57 of one of the spring members 56. It will be apparent from the showing in Figure 2 that as the shaft 62 rotates the teeth of each cam gear 64 will successively engage one of the cam surfaces 57 and cause a vibratory movement to be transmitted to the shoes 31. This vibratory movement serves to shake the material within the shoes and prevents the material from forming into lumps. Also any lumps which may have entered the shoes from the hopper are broken up by the vibration of the shoes.

A distributor 65 provided with a plurality of movable spaced partitions 66 is pivotally arranged adjacent the outer extremity of each shoe 31. As shown, a pair of arms 67 are secured at one end to the side walls 25 of the hoppers and the opposite ends of these arms are pivotally secured to the sides of the distributors adjacent the tops thereof as indicated at 68. The pivotal movement of the distributors is such that they may be raised from the operative position shown in Figure 2 to the inoperative position shown in Figure 4.

The partitions 66 have screws 69 extending therethrough and also through the walls of the distributors to secure the partitions in position and to permit swinging movement of the lower portion of each partition. Obviously each partition may be swung to any desired position and when the screws 69 are tightened the partition will be retained in the desired position. Obviously the arrangement of the partitions provides a plurality of passageways through the distributor which may be changed both as to size and direction whereby the distribution of the material may be regulated over any desired area consistent with the width of the distributors.

The operation of the device is as follows:

Material such as lime and guano is fed into the hoppers 24 and this material will pass through the shoes 31. While the hoppers are being filled the doors 45 are closed to prevent the escape of material from the shoes until the machine is ready to be operated. The door 35 may then be adjusted to a suitable height to permit a predetermined amount of the material to pass from the shoes after which the outer doors may be opened. The position of the partitions in the distributors is then fixed as desired and the distributors lowered to the position shown in Figure 2. With these preparations the machine is ready to begin operation.

The machine is hauled by animals or other power to the position in the field where distribution of the material is to take place. As the machine begins its travel the doors 45 are manually opened by lifting the handle 49 and securing the slot 51 in the bracket 50 thus holding the doors open. Material will then pass from the shoes and through the distributors to the earth.

When the machine reaches the end of a field it is necessary to close the doors 45 to prevent the flow of material while the machine is being turned for its return journey and the springs 51' will quickly cause both doors 45 to be simultaneously closed when the handle 49 is released from engagement with the bracket 50. If the shoes were not pivoted to the hoppers, the doors 45 would close the shoes without moving the latter but as vibratory movement of the shoes is essential, the latter must be pivotally mounted. Also, it is desirable to disengage the cam surfaces 57 and the cam gears 64 when the doors 45 are closed to prevent the material from being accidentally shaken out of the shoes. With our construction the springs 56 will transmit vibratory movement to the shoes while material is being distributed and after the doors 45 are closed the pivotal movement of the shoes causes the cam surfaces of the springs to be moved out of engagement with the cam gears 64.

It is also necessary that the shoes quickly return to their operative position when the doors 45 are opened. When the shoes are in their closed or inoperative position shown in Figure 4, the springs 56 also serve to resiliently oppose pivotal movement of the shoes and consequently the shoes will be urged to operative position when the doors 45 are opened. In addition, the weight of the springs 56 will also tend to return the shoes to operative position and it will therefore be apparent that the shoes have a normal bias to their operative position. In Figure 4, we have shown the position of the springs 56 engaging the projections 58 on the hoppers when the doors 45 are in closed position. When the position shown in Figure 2 has been reached by the shoes the cam surfaces 57 of the springs will be in engagement with the teeth of the cam gears 64 and as the latter rotate through movement of the traction wheels the shoes 31 will be intermittently vibrated during passage of the machine over the earth and consequently a distribution of fine material without lumps will be assured.

When it is desired to move the hoppers horizontally to cover additional earth it is only necessary to turn the wing nuts 28 and release the spring clamps 26 whereby the latter will slide along the top of the bar 18. When the desired positions of the hoppers have been ascertained the wing nuts are again tightened and the hoppers secured in proper position. If the nuts 55 arranged on the bolts 53 have been tightened it will also be necessary to release these nuts a little in order to permit sliding movement of the bolts 53 in the slots 54 when the hoppers are adjusted.

It is believed apparent that we have provided a novel distributor in which the amount of material passing therefrom may be quickly gauged and the distribution thereof in fine streams without lumps assured. The machine also quickly permits the farmer to cover a large area of ground and the adjustments are such that they may be quickly and easily made to suit the particular type of ground being sowed.

It is to be understood that the form of the invention herewith shown and described is to be taken as a preferred example of the same and that various changes in the shape, size, and arrangement of parts may be resorted to without departing from the spirit of the invention or the scope of the subjoined claims.

We claim:

1. In an agricultural implement, a frame, a hopper carried by said frame and having a projection thereon, a pivoted shoe arranged adjacent the bottom of said hopper, said hopper being provided with an opening whereby material may flow therefrom into said shoe, an adjustable gate to control the amount of material flowing from said shoe, a second gate movable downwardly to prevent the flow of material from said shoe, said second gate tilting said shoe about its pivot point when the former is in its downward position, and spring means engageable with the projection on said hopper for resiliently opposing pivotal movement of said shoe.

2. In an agricultural implement, a frame, a hopper carried by said frame and having a projection thereon, a pivoted shoe arranged adjacent the bottom of said hopper, said hopper being provided with an opening whereby material may flow therefrom into said shoe, an adjustable gate to control the amount of material flowing from said shoe, a second gate movable downwardly to prevent the flow of material from said shoe, a spring member secured at one end to said shoe and having a cam surface on its opposite end, and means engaging said cam surface to vibrate said shoe, said second gate tilting said shoe about its pivot point when the former is in its downward position to disengage the cam surface of said spring member from said vibrating means, said spring member being adapted to engage the projection on said hopper to resiliently oppose further pivotal movement of said shoe and to urge said shoe to normal position when said second gate is returned to its upward position.

In testimony whereof we affix our signatures.

THOMAS HALL DEBNAM.
EDWIN CARL FERGUSON.